United States Patent
Haberman

(10) Patent No.: US 9,390,252 B2
(45) Date of Patent: Jul. 12, 2016

(54) MECHANISM FOR ASSOCIATING ANALOG INPUT DEVICE GESTURE WITH PASSWORD FOR ACCOUNT ACCESS

(71) Applicant: Google Inc., Mountain View, CA (US)

(72) Inventor: Ron Efraim Haberman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/220,027

(22) Filed: Mar. 19, 2014

(65) Prior Publication Data

US 2015/0058973 A1 Feb. 26, 2015

Related U.S. Application Data

(60) Provisional application No. 61/867,985, filed on Aug. 20, 2013.

(51) Int. Cl.
*G06F 21/31* (2013.01)
*G06F 21/36* (2013.01)

(52) U.S. Cl.
CPC ..................................... *G06F 21/36* (2013.01)

(58) Field of Classification Search
CPC ............................ G06F 21/31; G06F 3/04883
USPC ............. 726/19, 2, 5, 12; 713/183, 185, 186; 463/13, 37
See application file for complete search history.

(56) References Cited

U.S. PATENT DOCUMENTS

| | | | | |
|---|---|---|---|---|
| 8,622,799 | B2 * | 1/2014 | Pececnik ................. | A63F 13/10 463/13 |
| 2009/0143141 | A1 * | 6/2009 | Wells ...................... | G07F 17/32 463/37 |
| 2011/0080339 | A1 * | 4/2011 | Sun ......................... | G06F 3/017 345/157 |
| 2013/0219490 | A1 * | 8/2013 | Isbister et al. ................... | 726/19 |
| 2014/0019352 | A1 * | 1/2014 | Shrivastava .................... | 705/41 |
| 2014/0082694 | A1 * | 3/2014 | Sanghavi .......................... | 726/3 |

OTHER PUBLICATIONS

"The Evolution of Game Controllers and Control Schemes and their Effect on their games"—Alastair H. Cummings, University of Southampton, Feb. 2007 http://mms.ecs.soton.ac.uk/2007/papers/6.pdf.*

* cited by examiner

*Primary Examiner* — Randy Scott

(57) ABSTRACT

A method for associating an analog input device gesture with an account for account access includes creating a user identifier for an account, creating a password for the account, generating the analog input device gesture, and associating the analog input device gesture with the account.

30 Claims, 17 Drawing Sheets

| Username | |
|---|---|
| 555 Wisteria Lane | |
| Password | |

Accept   Cancel

FIG. 1C

Username

555 Wisteria Lane

Password

******

Accept

Cancel

FIG. 1E

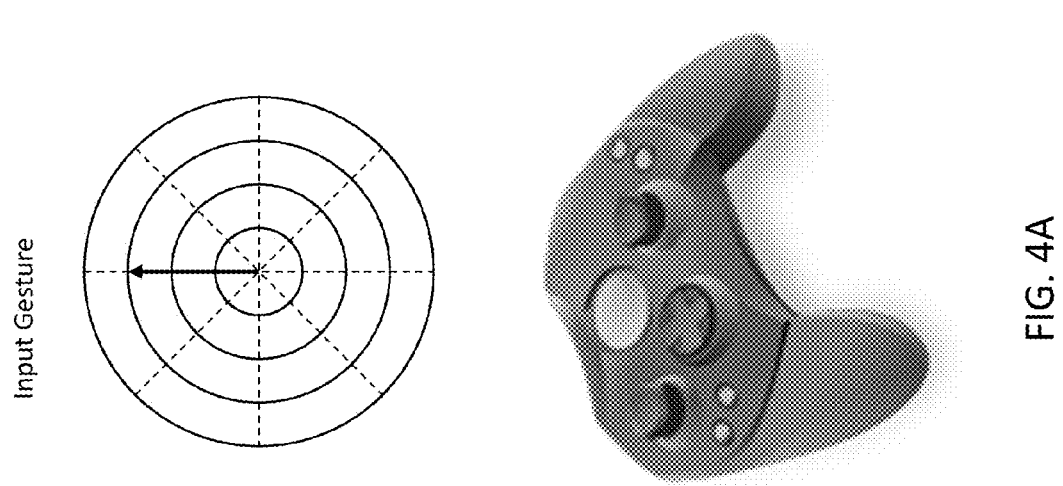

MECHANISM FOR ASSOCIATING ANALOG INPUT DEVICE GESTURE WITH PASSWORD FOR ACCOUNT ACCESS

CROSS-REFERENCE TO RELATED APPLICATIONS

The present application claims the benefit of U.S. Provisional Patent Application No. 61/867,985, filed on Aug. 20, 2013, which is hereby incorporated by reference in its entirety.

FIELD OF THE INVENTION

This invention relates to the field of account access, and in particular to a mechanism for associating analog input device gestures with passwords for account access.

BACKGROUND

Numerous services currently exist for providing various forms of content to users of client devices. For example, Netflix provides television and movie content to users which may be accessed via various client devices including gaming consoles, set-top boxes, mobile phones, etc. Gaming is another form of content in which services exist for providing games to users via their client devices.

In order to track a user's preferences, settings, previously accessed content, etc. accounts are created and personalized for users of the service. A user of a Netflix account may indicate particular preferences to be associated with his account such as movie genre or MPAA rating. Likewise, a user of a game content provider may indicate particular game types to be associated with his account such as first-person shooters or role playing games.

Many services provide for sub-accounts to be associated with a main billing account. This allows multiple users to be associated with the same billing account in a way that each user may personalize their own preferences while still being billed under the same main billing account. For example, a home may be associated with a Netflix account, and sub-accounts may be created for each member of the family (e.g., mom, dad, children, etc.). Each family member may maintain their own sub-account so that the personalized preferences of one family member do not interfere with the personalized preferences of another family member. The children in the family may then separate their programming preferences from those of their parents by accessing their personal sub-account.

Conventionally, these services allow for the main billing account to be accessed via a log-in that involves a username and password. A login prompt appears and the user is allowed to enter their login information via an input device (e.g., keyboard, joystick, etc.). Once the login credentials for the main billing account have been verified, the main billing account may remain open for subsequent uses in order to bypass the need to log-in every time.

However, with sub-accounts, an additional log-in procedure must be performed each time the main billing account switches between its users. Likewise when different billing accounts attempt to utilize a service through the same client device, an additional log-in procedure must be performed each time the main billing account is switched.

When login information is provided using a keyboard or touch-screen, entry may be done quickly and efficiently. However, when a user's input device does not include a keyboard interface, entry of login information may become cumbersome and tedious. Many services allow a user to provide login credentials via an input device (e.g., remote control) other than a keyboard. This is typically accomplished by mimicking a keyboard on a graphical user interface provided to the user and allowing the user to select individual characters on the keyboard by way of their input device. When the input device is a joystick or other type of directional pad, the user is required to move a cursor using its input device to each individual character in order to provide login credentials. When a billing account includes multiple sub-accounts, or similarly when multiple billing accounts are utilizing the same client device, constantly having to input login credentials using a non-keyboard device in order to switch between sub-accounts or billing accounts may become very time consuming. This is especially true where the login credentials are complex (e.g., include upper-case and lower-case characters, include numbers and symbols, etc.)

SUMMARY

Embodiments of the invention concern a mechanism for associating an analog input device gesture with a password for account access. A method for associating an analog input device gesture with an account for account access includes creating a user identifier for an account, creating a password for the account, generating the analog input device gesture and associating the analog input device gesture with the account.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 1A-E illustrate an example mechanism for providing log-in credentials for account access.

FIGS. 4A-D illustrate an example of associating an analog input device gesture with a password for account access according to some embodiments.

DETAILED DESCRIPTION

Figure 1A:
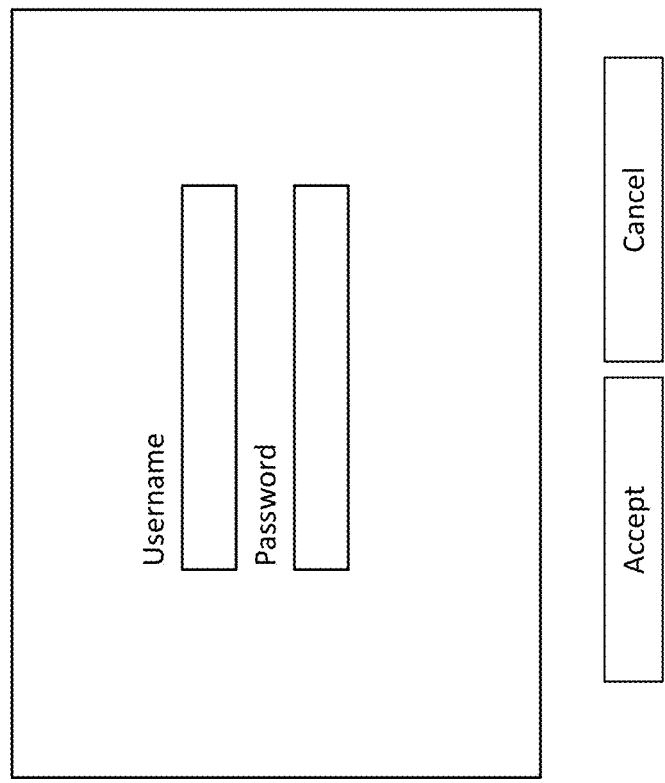

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment or embodiments.

According to some embodiments, a mechanism for associating an analog input device gesture with a password for account access is provided.

Numerous services currently exist for providing various forms of content, including music, movies and games to users of client devices. For example, Netflix provides television and movie content to users which may be accessed via various client devices including gaming consoles, set-top boxes, mobile phones, etc. Gaming is another form of content in which services exist for providing games to users via their client devices.

In order to bill a user for use of such services, accounts are created for those users. These accounts also allow for a user's preferences, settings, previously accessed content, etc. to be tracked and personalized. A user of a Netflix account may indicate particular preferences to be associated with his account such as movie genre or MPAA rating. Likewise, a user of a game content provider may indicate particular game types to be associated with his account such as first-person shooters or role playing games.

Many services provide for sub-accounts to be associated with the main billing account. This allows multiple users to be associated with the same billing account in a way that each user may personalize their own preferences while still being billed under the same main billing account. For example, a home may be associated with a Netflix account, and sub-accounts may be created for each member of the family (e.g., mom, dad, children, etc.). Each family member may maintain their own sub-account so that the personalized preferences of one family member do not interfere with the personalized preferences of another family member. The children in the family may then separate their programming preferences from those of their parents by accessing their personal sub-account.

Conventionally, these services allow for the main billing account to be accessed via a log-in that involves a username and password. A login prompt appears and the user is allowed to enter their login information via an input device (e.g., keyboard, joystick, etc.). Once the login credentials for the main billing account have been verified, the main billing account may remain open for subsequent uses in order to bypass the need to log-in every time.

However, with sub-accounts, an additional log-in procedure must be performed each time the main billing account switches between its users. Likewise when different billing accounts attempt to utilize a service through the same client device, an additional log-in procedure must be performed each time the main billing account is switched.

When login information is provided using a keyboard or touch-screen, entry may be done quickly and efficiently. However, when a user's input device does not include a keyboard interface, entry of login information may become cumbersome and tedious. Many services allow a user to provide login credentials via an input device (e.g., remote control) other than a keyboard. This is typically accomplished by mimicking a keyboard on a graphical user interface provided to the user and allowing the user to select individual characters on the keyboard by way of their input device. When the input device is a joystick or other type of directional pad, the user is required to move a cursor using its input device to each individual character in order to provide login credentials. When a billing account includes multiple sub-accounts, or similarly when multiple billing accounts are utilizing the same client device, constantly having to input login credentials using a non-keyboard device in order to switch between sub-accounts or billing accounts may become very time consuming. This is especially true where the login credentials are complex (e.g., include upper-case and lower-case characters, include numbers and symbols, etc.).

FIGS. 1A-E illustrate an example mechanism for providing log-in credentials for account access. The example mechanism for providing log-in credentials for account access illustrated in FIGS. 1A-E utilizes a client device having an input device that does not include a keyboard interface, such as for example, a game controller or remote control.

FIG. 1A illustrates an initial log-in prompt that appears on a graphical user interface of the client device for allowing the user to input log-in credentials. The log-in credentials include a username prompt where the user provides his unique account identifier and a password prompt where the user provides a password corresponding to his unique account identifier. Once the user has provided both a username and password, the log-in information is verified by the content service provider and the user is given access to his account upon verification of his log-in credentials.

Figure 1B:
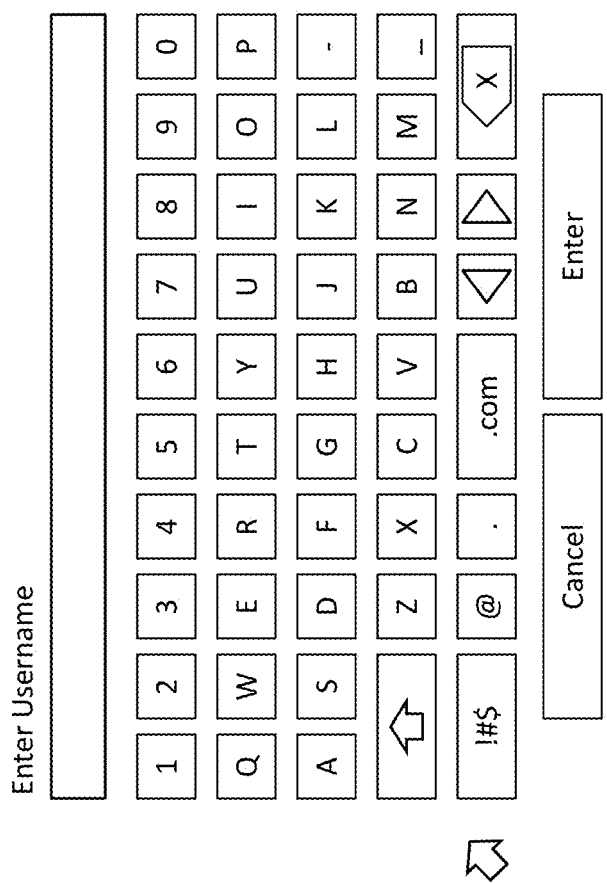

Because the client device is not associated with an input device having a keyboard interface, the log-in prompt mimics a keyboard on the graphical user interface to allow the user to input his log-in credentials. When the user selects the username portion of the log-in prompt the user of the client device is provided a mimicked keyboard via the GUI for selecting characters to input his username. FIG. 1B illustrates an example GUI having a mimicked keyboard for inputting a username. The user of the client device uses his input device to control a cursor displayed on the GUI to select characters on the mimicked keyboard for inputting his username.

The process for inputting a username via the input device and mimicked keyboard can become very cumbersome and tedious the more complex the characters making up the username become. For example, where a username includes upper case characters, the user may be required to perform a two-step process that includes first selecting a shift key and then selecting a corresponding character in order to input the character in an upper case format. The user may subsequently have to perform another two-step process that includes deselecting the shift key and then selecting a corresponding character in order to input a subsequent character in a lower case format.

Additionally, when the username includes symbols, the user may be required to perform a two-step process that includes first selecting a symbol key that toggles the mimicked keyboard between an alphanumeric mode and a symbol mode and then selecting a corresponding symbol in order to input the symbol. The user may subsequently have to perform another two-step process that includes deselecting the symbol key to allow the mimicked keyboard to toggle back to the alphanumeric mode and then selecting a corresponding character in order to input a subsequent alphanumeric character.

Additionally, when a user makes a typo (e.g., types in the wrong character or omits a character) in providing his username, the process for backtracking and correcting the typo can also be tedious and cumbersome for the same reasons described above.

Figure 1D:
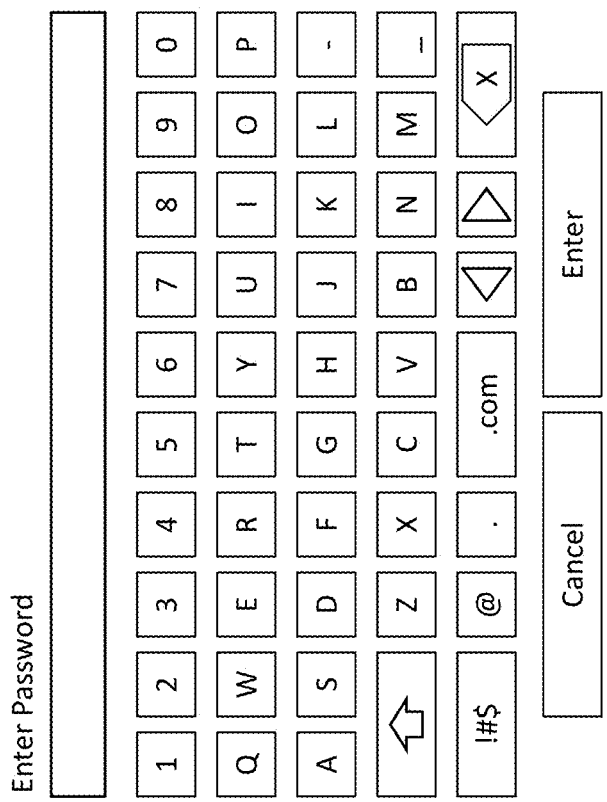

Once the user has provided his username via his input device and mimicked keyboard, the log-in prompt re-appears on the graphical user interface of the client device as illustrated in FIG. 1C. When the user selects the password portion of the log-in prompt the user of the client device is provided a mimicked keyboard via the GUI for selecting characters to input his password as shown in FIG. 1D.

The disadvantages described above in providing a username via an input device having no keyboard interface are again present when inputting the password via an input device having no keyboard interface. These disadvantages may be even more significant in the case of inputting a password because users typically select very complex character sets as passwords in order to minimize the likelihood of their password being discoverable to others.

Once the user has input his password via his input device and the mimicked keyboard, the user may confirm his log-in credentials as illustrated in FIG. 1E. The log-in credentials are then verified by the content provider service and the user is allowed access to his account upon verification.

When more than one account is accessed from the same client device, the log-in process described above may be required each time that accounts are switched. This results in a very cumbersome and inefficient process for switching access between accounts from the same client device.

Figure 2A:
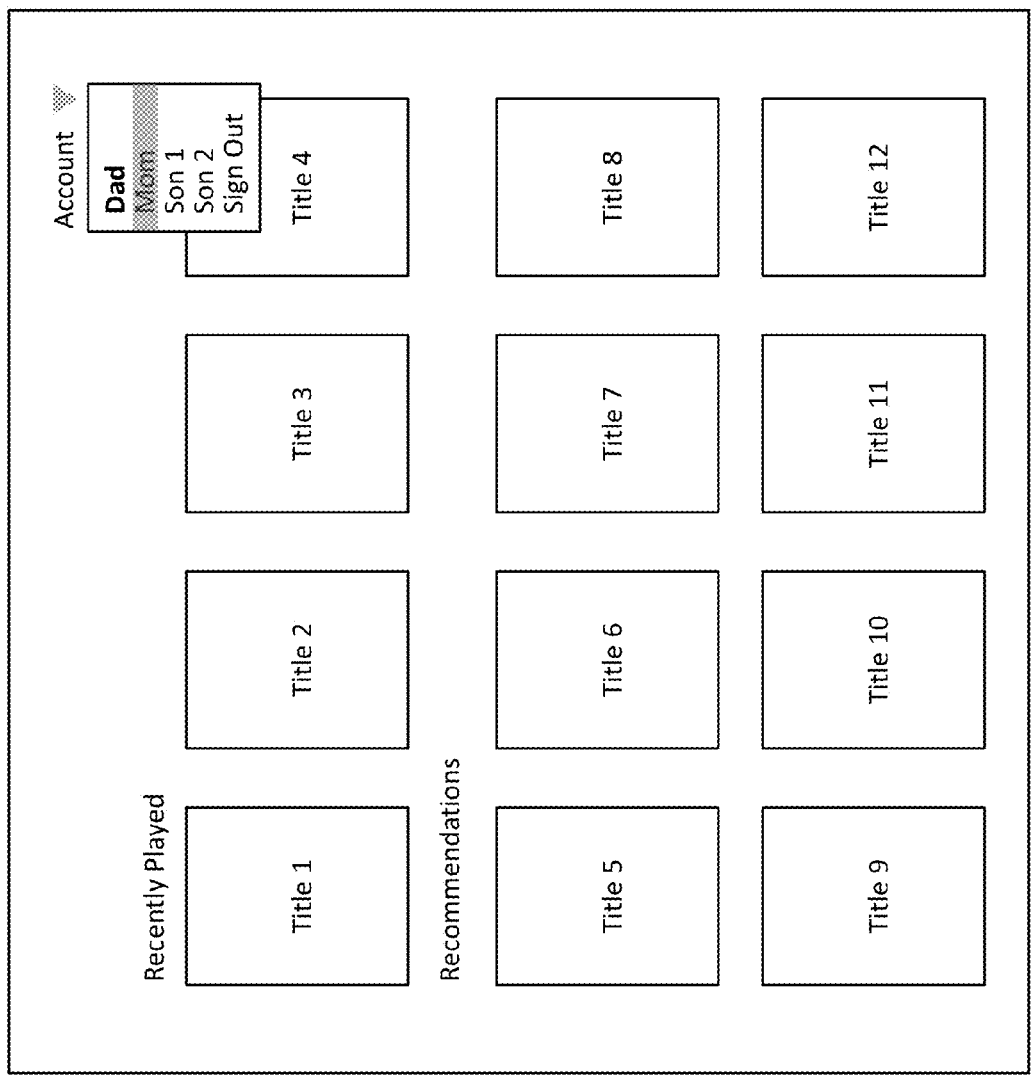
FIGS. 2A-B illustrate an example mechanism for switching between sub-accounts.
Figure 2B:
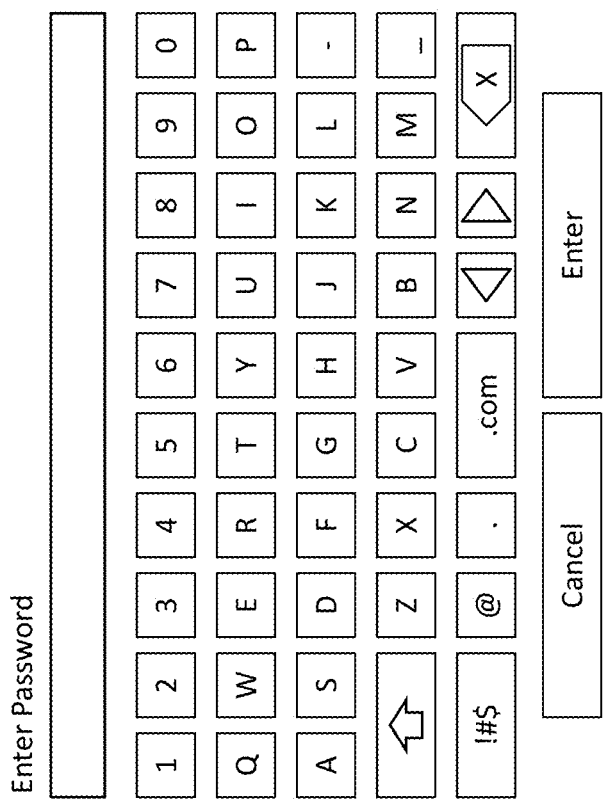

The same disadvantages associated with providing log-in credentials by way of an input device having no keyboard interface may also be present in the situation where users wish to switch between sub-accounts associated with a main billing account. FIGS. 2A-B illustrate an example mechanism for switching between sub-accounts.

In the situation where a main billing account has several sub-accounts, the need for providing log-in credentials when switching between sub-accounts may again arise. Some services require a user to only provide log-in credentials for the main billing account once and allows the main billing account to remain open for subsequent access until a time limit is met or the user decides to logout. However, even in that situation, switching between sub-accounts of the main billing account may still require a user to provide log-in credentials.

FIG. 2A illustrates a menu interface displayed on a GUI after a user has already provided verified log-in credentials for the main billing account. The sub-account displayed on the menu interface may be a default sub-account, such as for example, a primary sub-account associated with the main billing account. Alternatively, the sub-account displayed on the menu interface may be the sub-account most recently accessed.

An account pull-down tab may be present on the menu interface that allows a user of the content service provider to select an appropriate sub-account. The content displayed on the menu interface is different for each sub-account because of personalized sub-account preferences, settings, previously accessed content, etc. Because of the differences in sub-account content, users will select their own sub-account in order to access their own personalized content.

Currently the sub-account being accessed belongs to the Dad. This is illustrated in the menu interface of FIG. 2A, where the current sub-account is identified by bold characters. When another sub-account user decides to switch access to their own sub-account, they can initiate the process by selecting their sub-account from the pull-down tab. In FIG. 2A, the Mom decides to access her personal sub-account and does so by selecting the Mom sub-account from the pull-down tab. This is indicated by the highlight that surrounds the sub-account Mom in FIG. 2A.

Upon selecting the sub-account Mom, a log-in prompt appears for inputting a password associated with the sub-account. Sub-accounts are typically associated with passwords in order to protect sub-account users from unwanted access to their content.

When a user attempts to access a sub-account by providing log-in credentials using an input device having no keyboard interface, the same issues described above arise. Those issues include the cumbersome and tedious nature of entering complex characters such as uppercase characters and symbols as well as correcting typos.

What is needed is a mechanism for associating an input device gesture with a password for account access, such that a user looking to access an account is no longer required to enter a password using an input device without a keyboard interface and a mimicked keyboard on a GUI. Instead, the user may provide the input device gesture in place of the password in order to access his account (e.g., main billing account or sub-account). This saves time and complexity because the user is able to access his account directly from his input device, without having to use his input device to control a mimicked keyboard.

For purposes of illustration, the mechanism for associating an input device gesture with a password for account access will be described with reference to an analog input device gesture such as movement on a joystick or movement on an analog directional pad. However, it is important to note that the mechanism for associating an input device gesture with a password for account access can extended to any input device gesture (e.g., sequence of button entries, sequence of direction pad entries, etc.).

Figure 3:
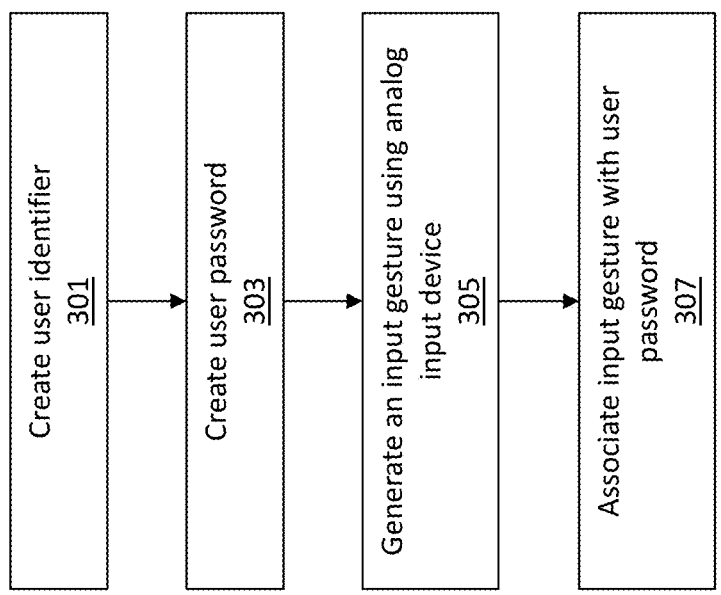
FIG. 3 is a flow diagram illustrating a method for associating an analog input device gesture with a password for account access according to some embodiments.

FIG. 3 is a flow diagram illustrating a method for associating an analog input device gesture with a password for account access according to some embodiments. Initially an account or sub-account holder creates a user identifier as shown at 301. The user identifier may be any combination of characters (e.g., letters, numbers, symbols) that allows a user to be associated with his account or sub-account. For example, a main billing account may be identified by the address of the home associated with the main billing account and the various sub-accounts may be identified by the names of the family members or the roles of the family members. This is illustrated in FIGS. 1C and 2A, where the username for the main billing account in FIG. 1C is the address of the home associated with the main billing account and where the usernames for the various sub-accounts in FIG. 2A are the roles of the family members.

After an account or sub-account holder has created a user identifier, the account or sub-account holder creates a password as shown at 303. Similar to the user identifier, the password may be any combination of characters (e.g., letters, numbers, symbols). The password is used to verify and authorize the user for account access and is often quite complex in order to prevent unwanted access. Although an analog input device gesture will later be associated with the password to allow for account access via the analog input device gesture rather than password entry, associating a password with the account or sub-account allows for an alternative or backup mechanism for account access. For example, where the analog input device gesture is not recognized by the service provider for whatever reason, password entry by way of the input device and mimicked keyboard is still available.

An analog input device gesture may then be generated as shown at 305. The analog input device gesture is a sequence of movements made with an analog component (e.g., joystick) of an input device (e.g., game controller). In some embodiments, a sequence of movements made with a single analog component of the input device may form the input device gesture. For example, where an input device such as a video game controller has an analog joystick, a user can generate a sequence of movements with the analog joystick to form the input device gesture.

In some embodiments, where the input device includes multiple analog components, a combination of movements between the different analog components may form the input device gesture. For example, where an input device such as a video game controller has a pair of analog joysticks, a user can generate a sequence of movements with a first analog joystick followed by a sequence of movements with a second analog joystick to form the input device gesture.

Movements making up an analog input device gesture may be recognized with various levels of precision. For example, when a user generates a sequence of movements representing an analog input device gesture, subsequent recognition of the analog input device gesture may require the user to provide those sequence of movements in a very precise manner (e.g., exactly as it was originally generated) or in a less precise manner (e.g., roughly the same as it was originally generated). In some embodiments, the sequence of movements making up the analog input device gesture may be mapped to discretized points in a coordinate system such that subsequence recognition of the analog input device gesture only requires the user to provide the sequence of movements in close proximity to those discretized points.

In some embodiments, the sequence of movements making up the analog input device gesture may be limited to a certain maximum number of movements. In other embodiments, the sequence of movements making up the analog input device gesture may encompass any number of movements.

In some embodiments, the movements making up the analog input device gesture may be limited to certain movements (e.g., up, down, left, right, semi-circle rotation, etc.). In other embodiments, the movements making up the analog input device gesture may encompass any movements that may be made using the analog component of the input device.

In some embodiments, the time taken to perform each movement may also be tracked for generating the analog input device gesture, such that subsequent recognition of the analog input device gesture may require the user to provide each movement for a certain period of time.

Once the sequence of movements representing the analog input device gesture has been generated and approved by the user, the analog input device gesture is associated with the account or sub-account password. In this way, subsequent access to the account or sub-account may be made using the analog input device gesture in place of entering the password. The process for accessing an account or sub-account is greatly simplified because a user is able to access his account by providing an analog input device gesture directly from his input device. This is especially beneficial where the user does not have an input device with a keyboard interface because the use of an analog component of his input device to generate a gesture is much more natural than using the input device to control a mimicked keyboard on a GUI.

FIGS. 4A-D illustrate an example of associating an analog input device gesture with a password for account access according to some embodiments. After a user has created a username and corresponding password for an account or sub-account, the service provider may prompt the user to generate an analog input device gesture to be associated with the password for subsequent account access. The user may then perform a sequence of movements using an analog component of his input device to generate the analog input device gesture.

For purposes of example, the method described below will be described with reference to the sequence of movements making up the analog input device gesture being mapped to discretized points in a coordinate system. However, it is important to note that movements making up an analog input device gesture may be recognized with various levels of precision.

The user performs a first movement using an analog component of his input device and the display tracks the movement of the analog component for the user to see as shown in FIG. 4A. In FIG. 4A, the user moves his analog joystick up to a point in the upward direction, which is tracked by the display.

Figure 4B:
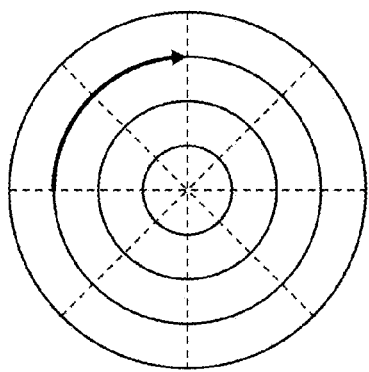
Figure 4B:

The user then performs a second movement using the analog component of his input device and the display tracks the second movement of the analog component for the user to see as shown in FIG. 4B. In FIG. 4B, the user moves his analog joystick a quarter-circle in the clockwise direction to a second point, which is tracked by the display.

Figure 4C:
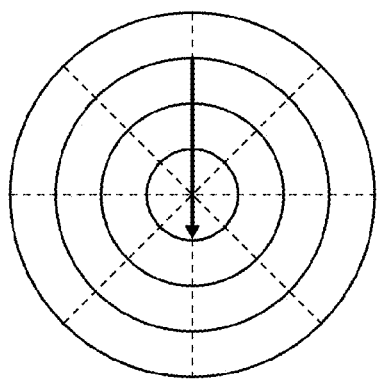
Figure 4C:

The user then performs a third movement using the analog component of his input device and the display tracks the second movement of the analog component for the user to see as shown in FIG. 4C. In FIG. 4C, the user moves his analog joystick to the left to a third point, which is tracked by the display.

Figure 4D:
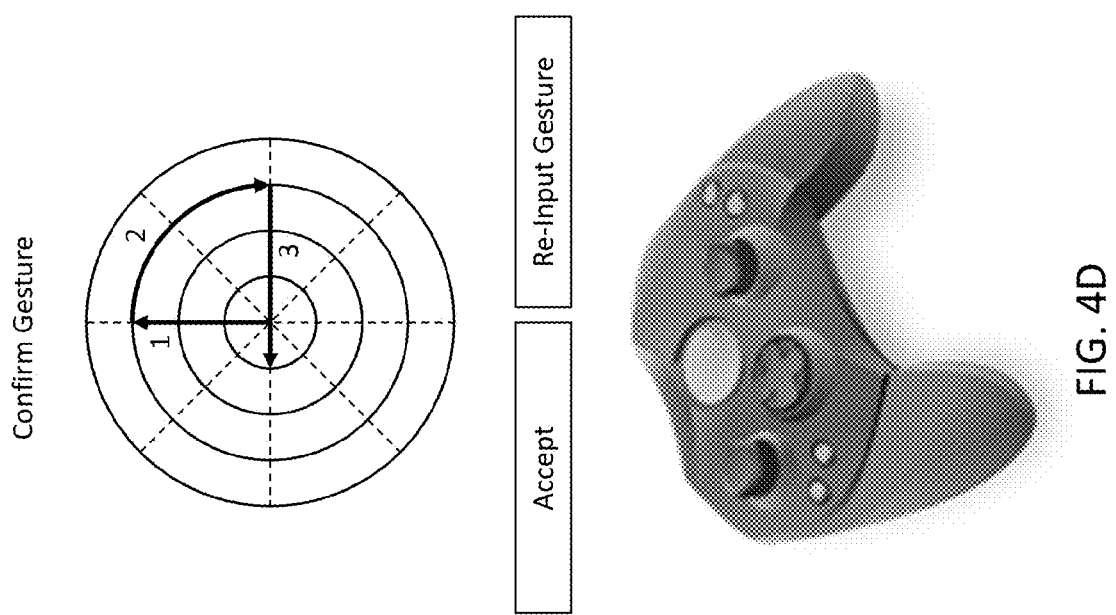

The user then stops moving the analog component of the input device. At this point, the sequence of movements making up the generated analog input device gesture is captured and displayed to the user as shown in FIG. 4D. The user is then given the opportunity to accept the sequence of movements as his analog input device gesture, or to re-input a different sequence of movements to represent his analog input device gesture.

Once the user has accepted the sequence of movements as his analog input device gesture, any subsequent account or sub-account access by the user may be made using the analog input device gesture. Additional details for accessing an account or sub-account using an analog input device gesture will be described below.

Figure 5:
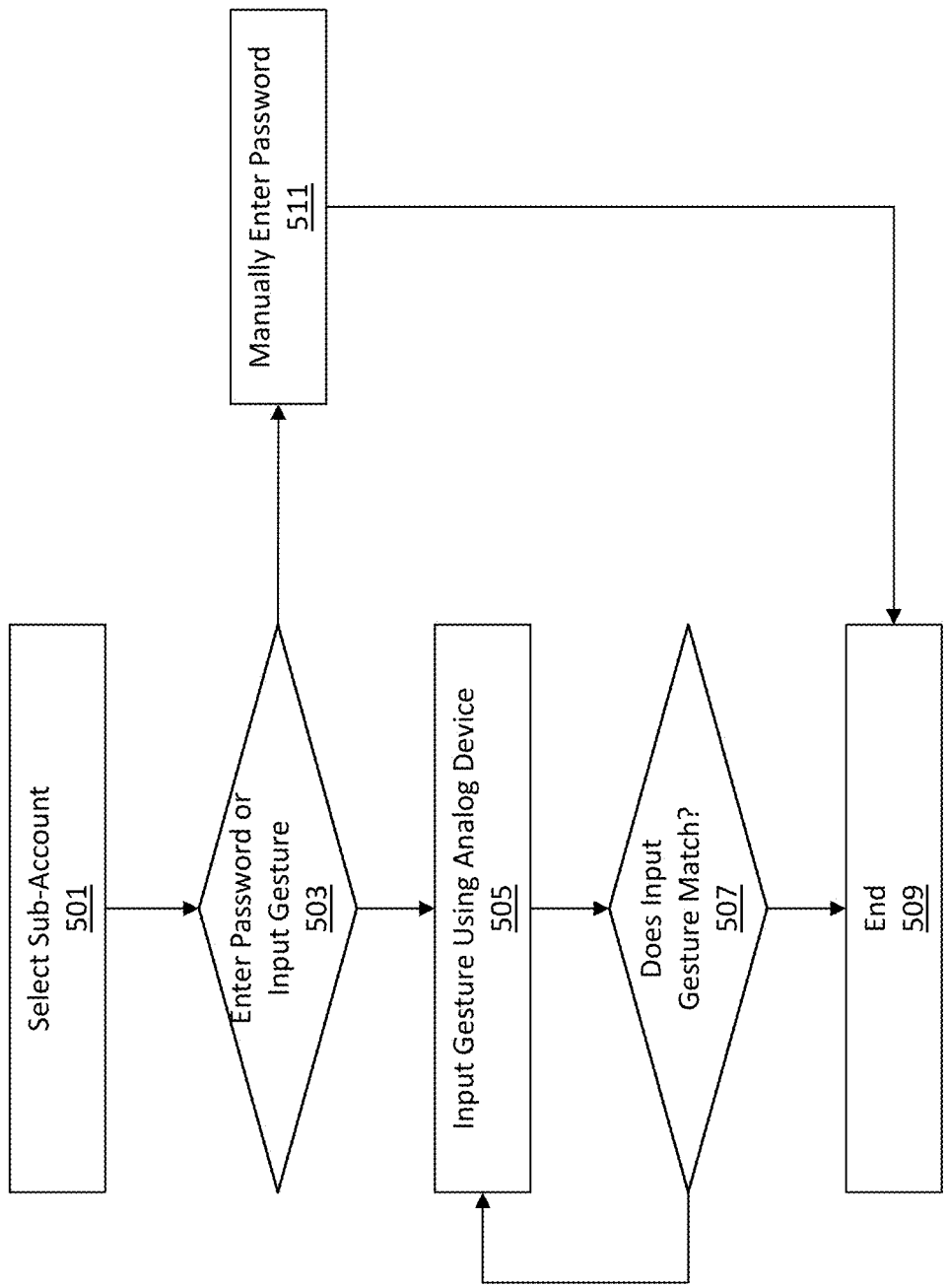
FIG. 5 is a flow diagram illustrating a method for switching between sub-accounts using an analog input device gesture according to some embodiments.

FIG. 5 is a flow diagram illustrating a method for switching between accounts or sub-accounts using an analog input device gesture according to some embodiments.

Initially a user may select a main billing account or a sub-account as shown at 501. When the user attempts to select a main billing account, a pull-down tab having usernames for all accounts that have been recently accessed using the client device may be provided. The user may simply choose the username corresponding to his billing account. Likewise when the user attempts to select a sub-account, a pull-down tab having usernames for all sub-accounts associated with the main billing account may be provided. The user may then simply choose the username corresponding to his sub-account.

Once the user has selected his account or sub-account, the user is prompted to either enter a password associated with the account or sub-account or alternatively provide an analog input gesture associated with the account or sub-account as shown at 503. If the user decides to enter a password rather than provide an analog input device gesture, the user may then manually enter his password as shown at 511. Manual entry of the password may involve using an input device having no keyboard interface to control a mimicked keyboard displayed in a GUI as described above in FIGS. 1A-E and 2A-B.

If the user decides to provide an analog input device gesture, the user performs a sequence of movements using an analog component of his input device as shown at 505. The user attempts to perform the sequence of movements in the same manner as performed when the analog input device gesture was generated. For example, where the sequence of movements making up the generated analog input device gesture are those provided in FIGS. 4A-D, the user will attempt to first move his analog joystick up to the first point in the upward direction, followed by moving his analog joystick a quarter-circle in the clockwise direction to the second point, followed by moving his analog joystick to the left to the third point.

A determination is then made as to whether analog input device gesture provided by the user matches the analog input device gesture originally generated for account access as shown at 507. If the analog input device gesture provided by the user fails to match the analog input device gesture originally generated for account access, the method may return to 505 where the user is again provided the opportunity to enter a sequence of movements representing an analog input device gesture using his input device. In some embodiments, the user may be limited to a certain maximum number of re-tries, where account access is denied after failing to provide the correct sequence of movements that represent the analog input device gesture a maximum number of times.

If the analog input device gesture provided by the user matches the analog input device gesture originally generated for account access, the user is provided access to his account or sub-account as shown at 509.

By allowing a user to access an account or sub-account using an analog input device gesture rather than having to manually enter a password, the process for accessing an account or sub-account may be greatly simplified. This is because a user is able to access his account by providing an analog input device gesture directly from his input device, which is much more natural than using the input device to control a mimicked keyboard on a GUI.

Figure 6A:
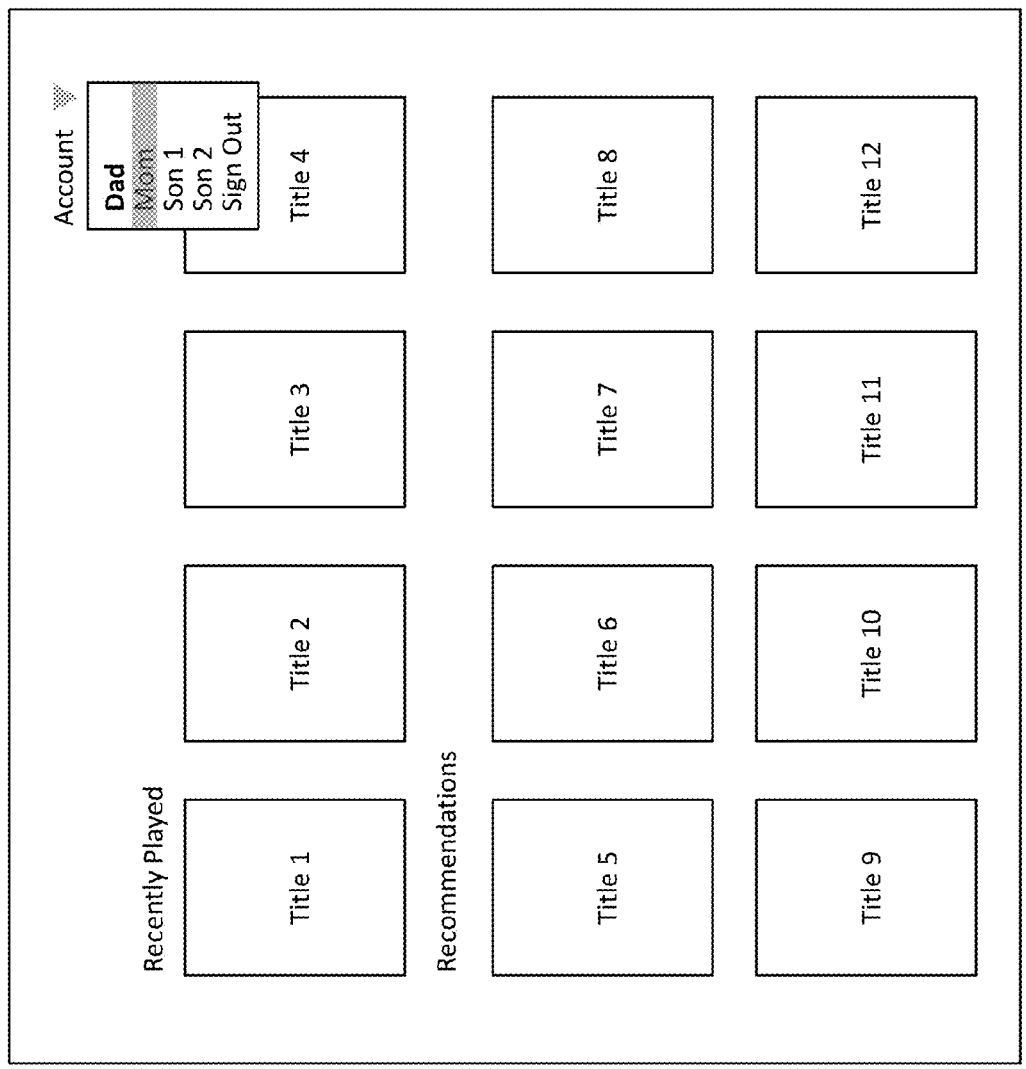
FIGS. 6A-C illustrate an example of switching between sub-accounts using an analog input device gesture according to some embodiments.
Figure 6B:
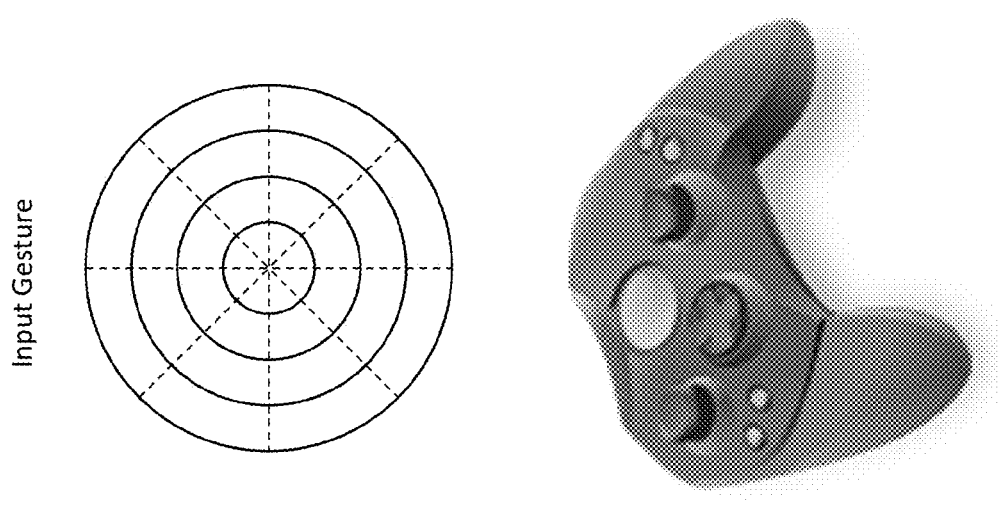
Figure 6C:
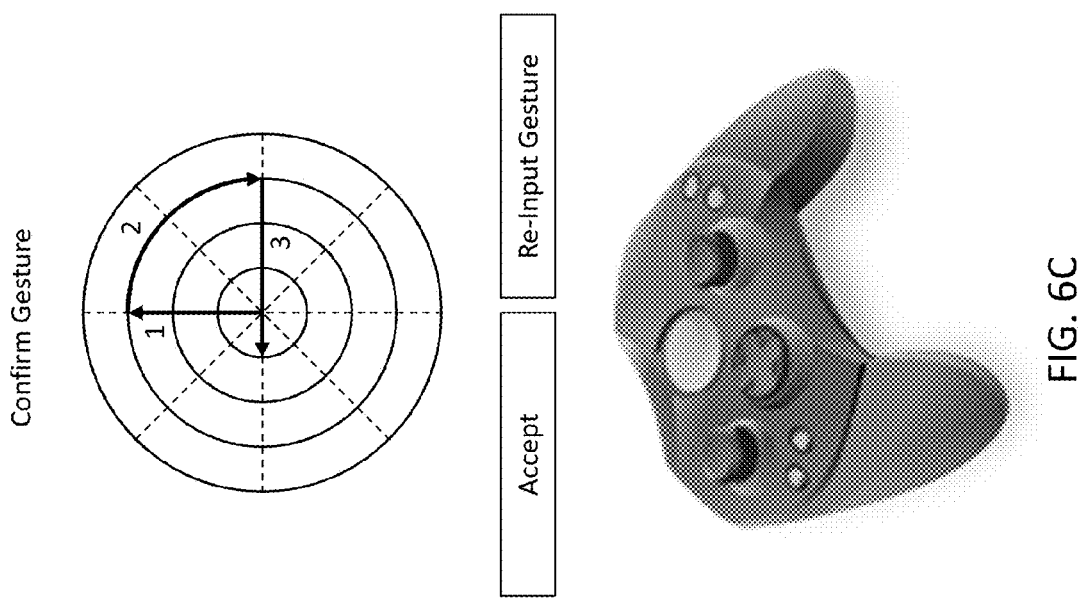

FIGS. 6A-C illustrate an example of switching between sub-accounts using an analog input device gesture according to some embodiments. While the example illustrated in FIGS. 6A-C pertain to the context of switching between sub-accounts using an analog input device gesture, it is important to note that analog input device gestures can be used to switch between main billing accounts in a similar manner.

A menu interface is displayed on a GUI after a user has already provided verified log-in credentials for the main billing account as illustrated in FIG. 6A. As described above, an account pull-down tab may be present on the menu interface that allows a user of the content service provider to select an appropriate sub-account. The content displayed on the menu interface is different for each sub-account because of personalized sub-account preferences, settings, previously accessed content, etc. Because of the differences in sub-account content, users will select their own sub-account in order to access their own personalized content.

Currently the sub-account being accessed belongs to the Dad. This is illustrated in the menu interface of FIG. 6A, where the current sub-account is identified by bold characters. When another sub-account user decides to switch access to their own sub-account, they can initiate the process by selecting their sub-account from the pull-down tab. In FIG. 6A, the Mom decides to access her personal sub-account and does so by selecting the Mom sub-account from the pull-down tab. This is indicated by the highlight that surrounds the sub-account Mom in FIG. 6A.

Upon selecting the sub-account Mom, a prompt appears for inputting an analog input device gesture associated with the password for the sub-account. FIG. 6B illustrates the prompt for inputting the analog device gesture appearing automatically upon selection of a sub-account, but alternatively the user of the sub-account may be given the option of deciding whether to gain sub-account access by inputting a password or by inputting an analog input device gesture.

The user may then provide a sequence of movement representative of his analog input device gesture using the analog component of his input device. Once the user of the sub-account has input his corresponding analog input-device gesture, the sequence of movements making up the analog input device gesture is captured and displayed to the user as shown in FIG. 6C. The user is then given the opportunity to accept the sequence of movements as his analog input device gesture, or to re-input a different sequence of movements to represent his analog input device gesture.

Once the user has accepted the sequence of movements as his analog input device gesture, the analog input device gesture may be verified and the user may be granted access to his sub-account.

System Architecture

Figure 7:
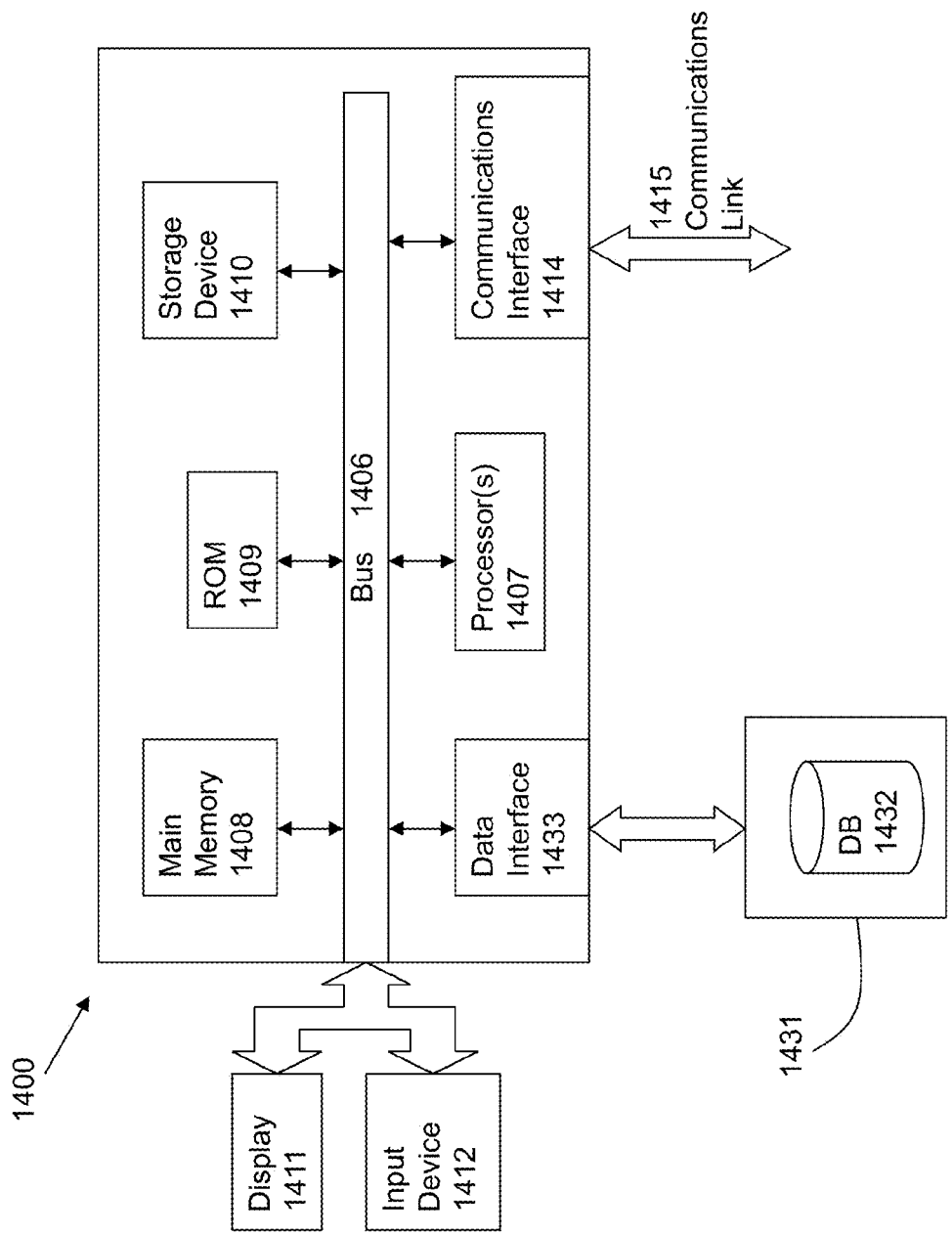
FIG. 7 is a block diagram of an illustrative computing system suitable for implementing some embodiments of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for associating an analog input device gesture with an account for account access, comprising:
    receiving a user identifier for an account;
    receiving a password for the account;
    generating the analog input device gesture in response to an input received at an input device including a body and at least one physical analog component movably coupled with respect to the body, the analog input device gesture including a sequence of movements of the at least one physical analog component of the input device relative to the body of the input device;
    associating the analog input device gesture with the account; and
    storing the analog input device gesture for account access during subsequent sessions.

2. The method of claim 1, wherein the user identifier is a combination of characters.

3. The method of claim 1, wherein the password is a combination of characters.

4. The method of claim 1, wherein the password provides an alternative mechanism for account access.

5. The method of claim 1, wherein the account is a main billing account.

6. The method of claim 1, wherein the account is a sub-account.

7. The method of claim 1, wherein the at least one physical analog component includes a joystick pivotably coupled to the body of the input device, and wherein the sequence of movements of the at least one physical analog component includes a sequence of movements of the joystick relative to the body of the input device.

8. The method of claim 1, wherein the at least one physical analog component includes a first joystick pivotably coupled to the body of the input device and a second joystick pivotably coupled to the body of the input device, and wherein the sequence of movements of the at least one physical analog component includes at least one movement of the first joystick relative to the body of the input device and at least one movement of the second joystick relative to the body of the input device.

9. The method of claim 7, further comprising mapping the sequence of movements making up the analog input device gesture to discretized points in a coordinate system.

10. The method of claim 7, further comprising limiting the sequence of movements making up the analog input device gesture to a maximum number of movements.

11. The method of claim 7, further comprising limiting the sequence of movements making up the analog input device gesture to certain recognized movements.

12. The method of claim 7, further comprising tracking a time for each movement in the sequence of movements making up the analog input device gesture.

13. The method of claim 1, further comprising:
    receiving a selection of the account for access;
    receiving an entry analog input device gesture for access to the account;
    providing access to the account when the received entry analog input device gesture matches the analog input device gesture associated with the account and stored for account access during subsequent sessions.

14. The method of claim 13, further comprising receiving another entry analog input device gesture for access to the account when the previously received entry analog input device gesture does not match the analog device gesture associated with the account.

15. The method of claim 14, wherein receiving another entry analog input device gesture includes receiving another entry analog input device gesture a maximum number of times.

16. A non-transitory computer readable medium having stored thereon a sequence of instructions which, when executed by a processor causes the processor to execute a method for associating an analog input device gesture with an account for account access, comprising:
    creating a user identifier for an account;
    creating a password for the account;
    generating the analog input device gesture in response to an input received at an input device including a body and at least one physical analog component movably coupled with respect to the body, the analog input device gesture including a sequence of movements of the at least one physical analog component of the input device relative to the body of the input device;
    associating the analog input device gesture with the account; and
    storing the analog input device gesture for account access during subsequent sessions.

17. The non-transitory computer readable medium of claim 16, wherein the user identifier is a combination of characters.

18. The non-transitory computer readable medium of claim 16, wherein the password is a combination of characters.

19. The non-transitory computer readable medium of claim 16, wherein the password provides an alternative mechanism for account access.

20. The non-transitory computer readable medium of claim 16, wherein the account is a main billing account.

21. The non-transitory computer readable medium of claim 16, wherein the account is a sub-account.

22. The non-transitory computer readable medium of claim 16, wherein the at least one physical analog component includes a joystick pivotably coupled to the body of the input device, and wherein the sequence of movements of the at least one physical analog component includes a sequence of movements of the joystick relative to the body of the input device.

23. The non-transitory computer readable medium of claim 16, wherein the at least one physical analog component includes a first joystick pivotably coupled to the body of the input device and a second joystick pivotably coupled to the body of the input device, and wherein the sequence of movements of the at least one physical analog component includes movements of the first joystick and the second joystick relative to the body of the input device.

24. The non-transitory computer readable medium of claim 22, wherein the sequence of movements of the at least one physical analog component relative to the body of the input device making up the analog input device gesture is mapped to discretized points in a coordinate system.

25. The non-transitory computer readable medium of claim 22, wherein the sequence of movements of the at least one physical analog component relative to the body of the input device making up the analog input device gesture is limited to a maximum number of movements.

26. The non-transitory computer readable medium of claim 22, wherein the sequence of movements making up the analog input device gesture is limited to certain recognized movements of the at least one physical analog component relative to the body of the input device.

27. The non-transitory computer readable medium of claim 22, wherein a time for each movement in the sequence of movements of the at least one physical analog component relative to the body of the input device making up the analog input device gesture is tracked.

28. The non-transitory computer readable medium of claim 16, the method for associating the analog input device gesture with the account for account access executed by the processor further comprising:

receiving a selection of the account for access;

receiving an entry analog input device gesture for access to the account;

providing access to the account when the received entry analog input device gesture matches the analog input device gesture associated with the account and stored for account access during subsequent sessions.

29. The non-transitory computer readable medium of claim 28, the method for associating the analog input device gesture with the account for account access executed by the processor further comprising receiving another entry analog input device gesture for access to the account when the previously received entry analog input device gesture does not match the analog device gesture associated with the account.

30. The non-transitory computer readable medium of claim 29, wherein receiving another entry analog input device gesture for access to the account when the previously received entry analog input device gesture does not match the analog device gesture associated with the account comprises receiving another entry analog input device gesture a maximum number of times.

* * * * *